Figure 1:
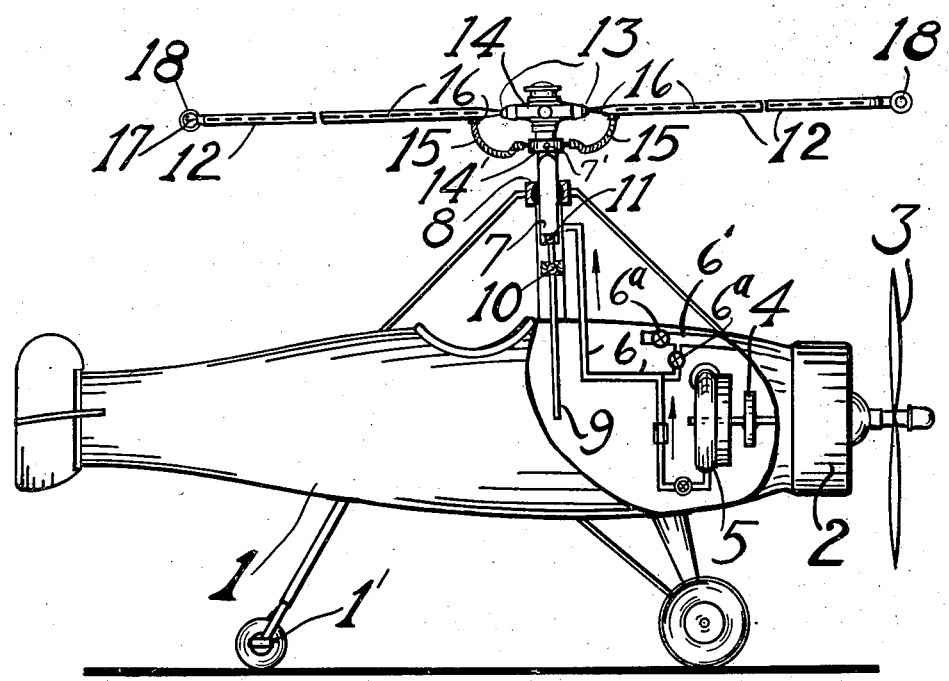

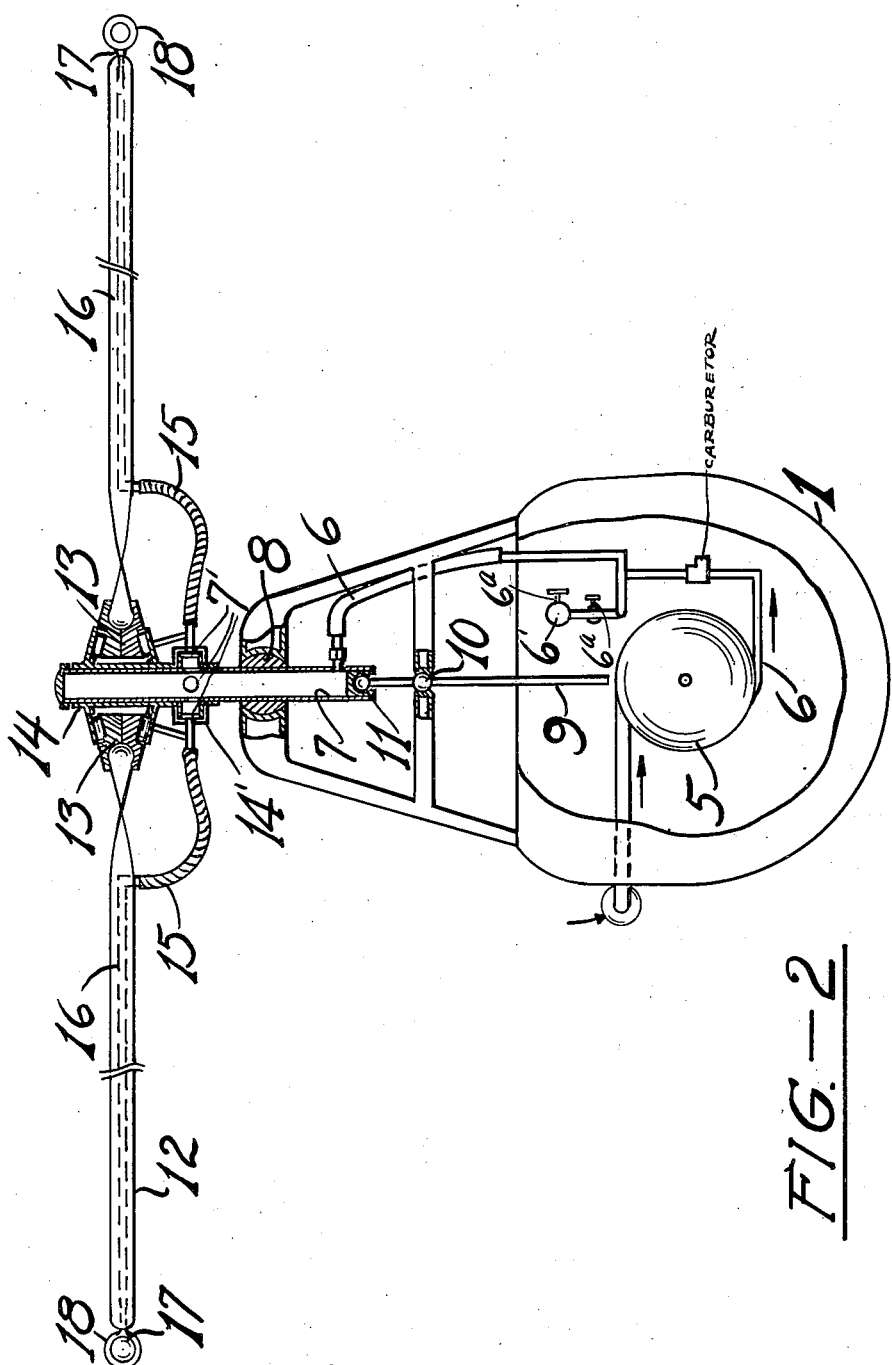

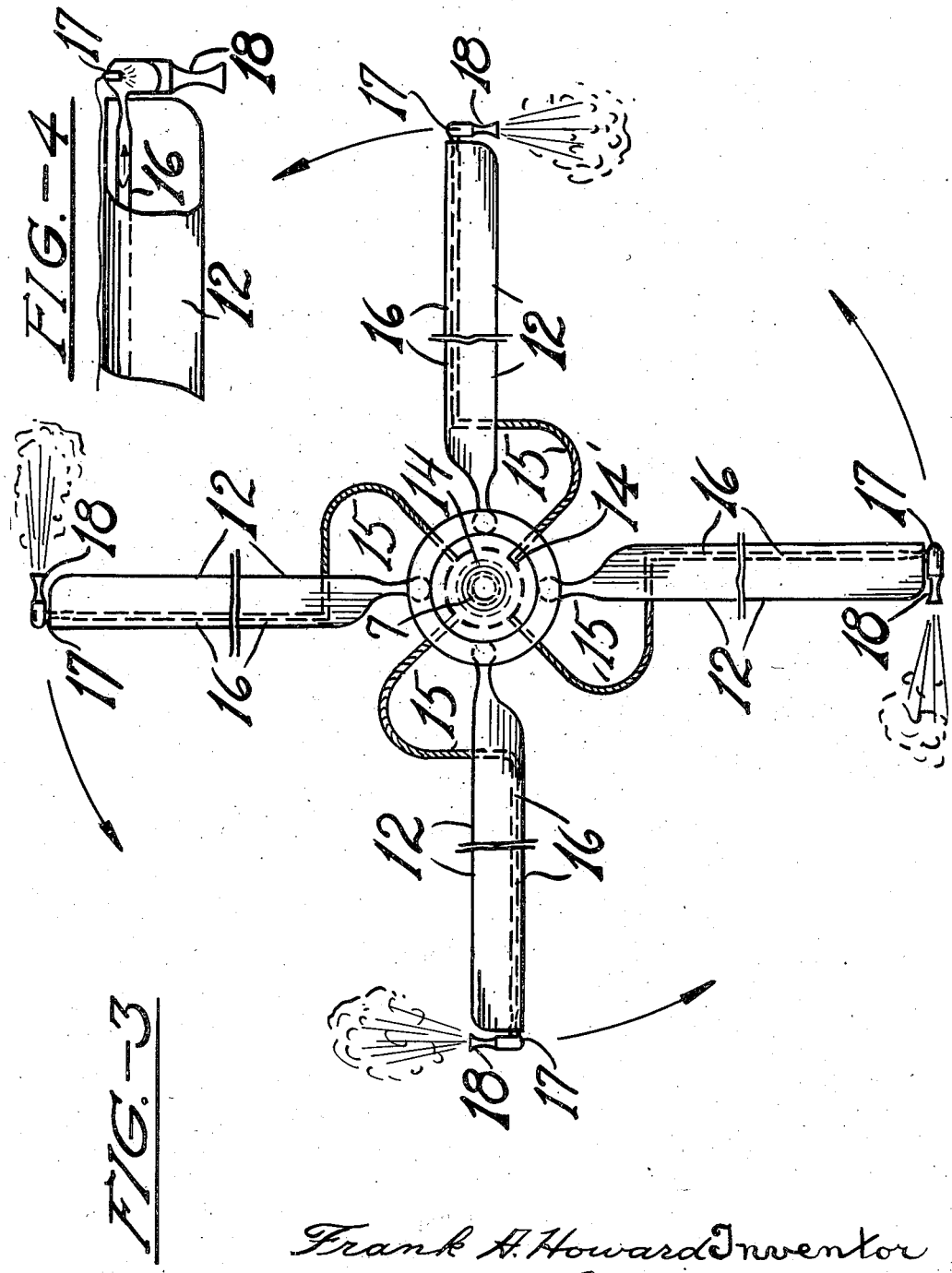

Patented Sept. 21, 1943

2,330,056

UNITED STATES PATENT OFFICE 2,330,056

ROTATING WING AIRCRAFT

Frank A. Howard, Elizabeth, N. J.

Application December 29, 1938, Serial No. 248,183

1 Claim. (Cl. 244—17)

The present invention relates to improvements in rotating wing aircraft and will be fully understood from the following specification taken in connection with the attached drawings.

In these drawings Figure I is a side elevation, partly in section, of an aircraft constructed in accordance with the invention. Figure II is a detail of the hub of the rotor, showing means for supplying combustible mixture to the blades, and Figure III is a detail of the combustion chamber.

The basic design of the aircraft of the present invention is the same as that of the rotating wing aircraft known as "autogyro," the current models of which are built without wings and ailerons, employing instead an adjustable axis for the rotor, which can be tilted to maintain lateral control, and to offset propeller torque reaction. This basic aircraft design, which is now well known in the art, is modified in the following particulars in accordance with the present invention:

1. *Propeller.*—The propeller is a full controllable pitch design, in accordance with present standard practice, the blades being pivoted at the roots to turn to a neutral position and to be advanced from that point to a full angle of incidence in as many steps as desired. The control and actuation of the propeller may be by means of a reversible electric motor mounted in the nose of the propeller and supplied with current through slip rings on the crank shaft inside of the propeller, but other equivalent means may be employed.

2. *Blower.*—The engine of the present aircraft is not only fitted with a propeller, as described above, but is also arranged to drive a blower, which may be of the centrifugal type, or may be a positive displacement rotary type blower. The blower is connected with the rear of the engine by a suitable clutch, which may be disengaged and engaged gradually without stopping the engine. The blower is of such size and capacity as to consume virtually the entire power of the engine at the full speed of the latter. The purpose of the blower is to deliver a combustible mixture under suitable pressure to combustion chambers carried on the tips of the rotor blades. The combustible mixture is formed from the usual engine fuel, gasoline, and air; the air being carbureted either on the suction or discharge side of the blower and suitable mechanism for this purpose is provided.

3. *Combustion chambers.*—The fuel and air from the blower (either as a single mixture, or in two mixture components) are delivered through appropriate conduits to combustion chambers carried on the ends of the rotor blades. (The engine exhaust may also be delivered to the combustion chambers.) Combustion takes place in these chambers either continuously or in a series of explosions, the construction being the same as that heretofore proposed for gas turbines. The combustion chamber nozzle discharges tangentially to the movement of the rotor, in a direction opposite to this movement. Ignition is effected in the usual way either by spark or hot wire.

The autogyro design, with the above basic modifications, becomes a combination helicopter and autogyro, the general operation of which is as follows:

The take-off is accomplished by adjusting the blades of the variable pitch propeller to a point very near their neutral position, leaving only a very small angle of incidence, to provide a slip stream effective for the cooling of the engine, and to give a minimum measure of effectiveness to the control surfaces of the machine, which are located on the tail in the usual way. Under these conditions the greater part of the power of the engine is available for the driving of the blower, which will be engaged through the clutch as soon as the engine has been started. The blower will deliver the combustible mixture to the combustion chambers on the rotor tips, where it will be ignited. The discharge of this gas (supplemented by the engine exhaust) from the combustion chambers drives the rotor in the proper direction for lift. This drive is accomplished without imposing any torque reaction on the machine. The efficiency of the combustion chambers as a means for applying power to the driving of the rotor is a function of their internal efficiency as a means for converting the heat energy of the fuel into kinetic energy of the gas, and of their external efficiency as measured by the relative velocity of the gases with reference to the discharge nozzles and of nozzles with reference to the mechanism.

Stability of the machine during vertical ascent is attained by the tilting of the axis of the rotor, as in the case of a normal autogyro control. Orientation is effected by the rudder tail surfaces under the influence of the slip stream. Wind drift during vertical ascent may be controlled by heading the machine into the wind and adjusting the variable pitch propeller to provide any necessary measure of thrust to offset wind drift. The rate of ascent is controlled by controlling the speed of the engine, or by throttling the blower to control the volume of combustion gas.

Strictly vertical ascent or descent is required only for a maximum of a few hundred feet, and then only for take-offs and landings in restricted areas, but is absolutely indispensable for these purposes, and for contacting the ground under conditions of adverse visibility or low ceiling. The transition from vertical ascent to normal autogyro flight is effected by increasing the pitch of the propeller to acquire forward velocity, and by proportionately reducing the delivery of the blower until minimum forward velocities for autogyro are attained, at which time the blower may be disengaged.

The machine in question therefore operates as a true helicopter for vertical ascent and descent, as an autogyro for normal flight down to the minimum speeds of the autogyro, and is capable of operating as a combination autogyro and helicopter at intermediate speeds.

In the event of motor failure, during vertical ascent or descent at low elevation, the machine may be permitted to pancake at low velocities. Motor failure at higher elevations during vertical ascent or descent would result in throwing the machine into a glide by the effect of the tail surfaces, so that a controlled autogyro dead stick landing would result.

From the above general description of the construction and operation of the machine, it will be recognized that it consists essentially of a new combination of old elements, the construction and operation of each of which is well understood in the art. Each of these elements is capable of wide variation in construction, as is well known, and since my invention relates only to the combination, and not to the particular construction of any one of the elements thereof, I have illustrated these elements only schematically in the annexed drawings.

Referring more particularly to these drawings, numeral 1 indicates a fuselage of normal autogyro construction, except that the tail wheel 1' is arranged to hold the fuselage horizontal. The motor 2 is mounted in the nose in the usual way, and serves to drive a variable pitch propeller 3. On the opposite, or inward, face of the motor, there is a friction clutch designated 4, and a rotary blower 5, which may suitably be of the construction used for supercharging large engines, and is of a capacity sufficient to absorb at its maximum speed upwards of 90% of the full power output of the engine at such speed, the remaining 10% being sufficient for the minimum requirements of the normal propeller 3 for providing a slip stream for engine cooling, and to assist in control by its effect on the tail surfaces. The stream of compressed air from the blower is delivered through a conduit 6 to a stationary hollow shaft 7, which serves as the axis of the rotor. The engine exhaust pipe 6' is also connected to the conduit 6, valves 6ª being provided so that the engine exhaust may escape directly to the air or be diverted through the conduit 6. The rotor axis is mounted in a ball support 8, carried by the fuselage, and is capable of being tilted in its ball support, with reference to the fuselage, by a control stick 9, also mounted in a ball joint at 10, and having its actuating end very much longer than the ball end 11, which is recessed in a suitable loose socket in the lower end of the axis. The rotor blades 12 are universally pivoted for limited angular movement at their roots as indicated at 13 in a rotating carrier ring or hub 14 which is brought down around the axis 7 to form a slip joint for picking up the combustible mixture. The combustible mixture is delivered by the pipe 6 through a cavity in the center of the axis 7, emerges from the axis through holes 7' into the annulus 14' formed by the lower portion of the hub 14. From this annulus the combustible mixture is carried by short flexible tubes 15 to stationary conduits 16 extending axially to the rotor blades. At the extremity of each rotor blade the conduit 16 is provided with a combustion chamber 17 which discharges through a nozzle 18.

The operation of the apparatus as above described will, it is believed, be fully understood from the general description heretofore given. In normal operation as an autogyro it functions in every respect in the normal manner of an autogyro. Its period of functioning as a helicopter is limited to the time of vertical ascent and descent in still air. During this operation as a helicopter, the propeller 3 is, as described above, adjusted to a position very near the neutral axis of the blades to provide the minimum slip stream necessary for engine cooling, or any larger amount desired for giving control through the tail surfaces. By engagement of the clutch 4 the blower 5 is set into operation to deliver through the conduits 6, thence through the stationary axis 7, hub 14, flexible tubes 15 and conduits 16, to the combustion chambers 17, located on each blade tip, a combustible mixture of gasoline vapor in air. This mixture is burned and expanded in the known way to convert its heat energy into kinetic energy in the combustion chamber 17 and nozzle 18. The hot stream of gas from the latter emerges tangentially at a point beyond the extremity of the wing, and by the reaction of this gas jet issuing from the tip of each rotor blade, power is applied uniformly and continuously to these blades to drive them in the direction required for lift of the aircraft. Because of the nature of this propulsive effect, there is no reaction torque, and it is therefore possible to employ a single rotor. By controlling the delivery of gas to and through the blower 5 and by controlling the speed of the engine 2, the power output of the combustion chambers applied to the driving of the rotor may be varied at will. By reducing the delivery of air through the blower and simultaneously increasing the propeller pitch, the thrust of the propeller increases, and the machine acquires quickly minimum flying speed as an autogyro, after which the clutch 4 may be disconnected to free the motor from the friction losses of the blower.

As an alternative construction, eliminating the clutch 4, the blower 5 where constructed as a centrifugal blower, may be left engaged at all times without substantial loss by evacuating its contents down to a low vacuum, inlet and outlet being closed at this time. This construction is recommended only for high delivery centrifugal blowers having small gear losses. It requires the addition of suitable means, such as a very small vacuum pump, for evacuating the blower casing.

I claim:

An aircraft comprising a fuselage, an engine carried by the fuselage, a variable pitch propeller driven by the engine, a freely rotating sustaining aerofoil carried by the fuselage, a radial conduit carried by the aerofoil, a tangentially discharging nozzle on the aerofoil connected to said conduit for discharging gases supplied therein tangentially from the aerofoil to drive the aerofoil, said nozzle including igniting means, a blower driven by the engine, a source of fuel, a carbureting device therefor, pipe means connecting the carbureting device to the intake of said blower, a valved blower pipe connecting the blower outlet with the radial conduit for delivering carburetted fuel under pressure through the conduit to the discharge nozzles where the fuel becomes ignited, an exhaust pipe leading from the engine to the blower pipe to permit flow of exhaust gases through the nozzle, a valve in the exhaust pipe, a clutch between the engine and the blower, and means for adjusting the propeller within the range from full to neutral position so that in one operation the engine is relieved of its propeller load to cut the traction to substantially zero while up to full force of the blower is used for lifting the aircraft and whereby in a second operation the propeller is driven at up to full traction while the blower is cut off from the aerofoil and the aerofoil is actuated by the engine exhaust gases.

FRANK A. HOWARD.